United States Patent
Nikitin et al.

(10) Patent No.: US 9,588,347 B2
(45) Date of Patent: Mar. 7, 2017

(54) DEVICE FOR GENERATING A VIRTUAL LIGHT IMAGE

(71) Applicants: Igor Nikitin, Hennef (DE); Martin Göbel, Bonn (DE); Gernot Heisenberg, Köln (DE)

(72) Inventors: Igor Nikitin, Hennef (DE); Martin Göbel, Bonn (DE); Gernot Heisenberg, Köln (DE)

(*) Notice: Subject to any disclaimer, the term of this patent is extended or adjusted under 35 U.S.C. 154(b) by 0 days.

(21) Appl. No.: 14/407,591

(22) PCT Filed: Jun. 5, 2013

(86) PCT No.: PCT/EP2013/061624
§ 371 (c)(1),
(2) Date: Dec. 12, 2014

(87) PCT Pub. No.: WO2013/186107
PCT Pub. Date: Dec. 19, 2013

(65) Prior Publication Data
US 2015/0153577 A1    Jun. 4, 2015

(30) Foreign Application Priority Data
Jun. 14, 2012 (DE) .......................... 10 2012 105 170

(51) Int. Cl.
G02B 27/14 (2006.01)
G02B 27/22 (2006.01)
G02B 5/12 (2006.01)

(52) U.S. Cl.
CPC ............. *G02B 27/144* (2013.01); *G02B 5/12* (2013.01); *G02B 27/2292* (2013.01)

(58) Field of Classification Search
CPC .... G02B 27/2292; G02B 27/144; G02B 5/12; G02B 27/22
(Continued)

(56) References Cited

U.S. PATENT DOCUMENTS 5,418,584 A * 5/1995 Larson ..................... G02B 5/12
353/122
5,552,934 A    9/1996 Prince
(Continued)

FOREIGN PATENT DOCUMENTS

DE        691 08 609 T2    11/1995
DE    10 2008 022 011 A1    11/2009
(Continued)

*Primary Examiner* — James Phan
(74) *Attorney, Agent, or Firm* — Pauley Erickson & Kottis

(57) ABSTRACT

A device for generating a virtual light image. The device includes a real light source, a curved retroreflector surface, and a semi-transparent mirror. The retroreflector surface is situated so that the light of the real light source transmitted through the semi-transparent mirror does not reach the retroreflector surface. A shape of the retroreflector surface for a given visibility range, at least in a subregion of the area that is essential for the image in the visibility range, is determined by the fact that at each point of the subregion, the pair of a reflection angle A and an optical distance between this point of the subregion of the retroreflector surface and the virtual light image is Pareto-minimal, provided that the subregion of the retroreflector surface does not interrupt primary beams from the real light source to the semi-transparent mirror.

24 Claims, 9 Drawing Sheets

(58) Field of Classification Search
USPC .......................... 359/546, 629–631; 250/200
See application file for complete search history.

(56) References Cited

U.S. PATENT DOCUMENTS

2009/0147335 A1    6/2009  Schumm, Jr. et al.
2010/0149182 A1    6/2010  Butler et al.

FOREIGN PATENT DOCUMENTS

| EP | 0 460 873 A1 | 12/1991 |
|----|--------------|---------|
| WO | WO 82/00911 A1 | 3/1982 |
| WO | WO 83/03019 A1 | 9/1983 |

\* cited by examiner

DEVICE FOR GENERATING A VIRTUAL LIGHT IMAGE

BACKGROUND OF THE INVENTION

Field of the Invention

This invention relates to a device for generating a virtual light image and includes a real light source, a retroreflector surface, and a semi-transparent mirror. The virtual light image of the real light source is produced in that light beams coming from the real light source are reflected on the surface of the semi-transparent mirror, then strike the surface of the retroreflector surface, and from there, through retroreflection, travel back to the semi-transparent mirror. The semi-transparent mirror allows a portion of these beams to pass through. The beams that the semi-transparent mirror allows to pass through then intersect essentially at a point. In this way, a suitably positioned observer perceives a (virtual) light source that appears to be positioned at this intersecting point.

Discussion of Related Art

Devices known from the prior art can implement the above-described concept.

PCT International Publication WO 82/00911 discloses a device for producing a virtual light source of the type mentioned at the beginning. Thus, the device uses the real light source, the retroreflector surface, and the semi-transparent mirror as described above. The retroreflector surface is embodied as flat and the semi-transparent mirror that is likewise embodied as flat is situated so that it is rotated by an angle of approximately 45 degrees relative to the retroreflector surface. The retroreflector surface in this case is situated so that the light of the real light source transmitted through the semi-transparent mirror does not reach the retroreflector surface.

European Patent Reference EP 0 460 873 A1 describes a device for producing a virtual light source by the real light source, the semi-transparent mirror, and two retroreflector surfaces. The retroreflector surfaces, which are embodied as flat, are arranged at right angles to each other. The semi-transparent mirror is placed between the retroreflector surfaces so that the two surfaces are positioned symmetrically with regard to the mirror.

German Patent Reference DE 10 2008 022 011 A1 describes another device for producing a virtual light image. The device in German Patent Reference DE 10 2008 022 011 A1 is characterized by the fact that the retroreflector surface and semi-transparent mirror are positioned parallel to each other.

PCT International Publication WO 83/03019 A1 discloses an embodiment of the device for producing the virtual light image, in which the retroreflector surface is embodied in the form of a sector of a cylinder. This embodiment has the disadvantage that the virtual light image is overlapped by the light of the real light source when an observer looks into the device from the front. In another embodiment in PCT International Publication WO 83/03019 A1, a retroreflector surface is curved in some regions and has perforations through which the light of the real light source situated behind it passes in the direction of the semi-transparent mirror. This embodiment in turn has the disadvantage of a poor light output, which results in a low intensity of the virtual light image.

Another device of the type mentioned at the beginning, with two retroreflector surfaces situated on both sides of a beam splitter is disclosed in German Patent Reference DE 691 08 609 T2.

The flat shape and the positioning of the retroreflector surface disclosed in the above-mentioned references have disadvantages that are primarily due to the properties of retroreflective materials.

The property of retroreflectors of reflecting incident light in the direction from which the light is coming is not ideal so that a given light beam is usually reflected as a light cone by the retroreflector surface. If the distance (optical distance) between a point on the retroreflector surface and the virtual light image is labeled D, then due to this non-ideal reflection, the sharpness of the image falls as D rises.

Furthermore, retroreflection is direction-dependent. If A is the angle (incidence angle) between the normal at a given point on the retroreflector surface and the incident light beam, where the angle A also corresponds to the angle (reflection angle) between the normal and the axis of the reflected light cone, then the opening angle of the light cone increases as A increases. This results in blurriness and a reduction in the brightness of the light image.

The use of a non-adapted retroreflector surface inevitably results in the occurrence of the deteriorations in above-mentioned image.

In particular, the arrangement of the retroreflector surface at an angle of 45 degrees relative to the semi-transparent mirror is also disadvantageous with regard to the size of the visibility range.

SUMMARY OF THE INVENTION

One object of this invention is to improve a device of the type mentioned at the beginning so that the sharpness, brightness, and visibility of the virtual light image can be increased.

The stated object and others can be attained by features described in this specification and in the claims.

Correspondingly, one device according to an embodiment of this invention for generating a virtual light image has a shape of the retroreflector surface for a given visibility range, at least in a subregion of the area that is essential for the image in the visibility range, is determined by, at each point of the subregion, the pair comprises the reflection angle A and the optical distance D is Pareto-minimal, provided that the subregion of the retroreflector surface does not interrupt primary beams from the real light source to the semi-transparent mirror.

In the context of this invention, a surface is described as a retroreflector surface if essentially every subarea of it has the retroreflection property. Thus in particular, apparatuses that are implemented with a single mirror, a double mirror, or a triple mirror should not be considered retroreflector surfaces.

The retroreflector surface that is curved according to this invention in particular has one advantage that the imaging properties of the device with regard to the sharpness, brightness, and visibility of the virtual image or light image can be improved through a favorable selection of the distance D and the angle A at each point of the retroreflector surface.

The semi-transparent mirror is embodied so that it reflects a portion of the light of the real light source and allows a portion of the light to pass through. According to this invention, the arrangement of the retroreflector surface is selected so that the light of the real light source that is transmitted through the semi-transparent mirror does not reach the retroreflector surface. This can be implemented, for example, if the retroreflector surface is positioned on the same side of the semi-transparent mirror as the real light source. In this case, the light of the real light source reflected by the semi-transparent mirror travels to the retroreflector surface where it is reflected back in the direction of the semi-transparent mirror. The virtual light image is therefore produced by the portion of the reflected light that the semi-transparent mirror allows to pass through. Depending on the configuration of the device, the portion of the reflected light that has been allowed to pass through no longer reaches the retroreflector surface.

A portion of the reflected light that has been allowed to pass through can theoretically reach the retroreflector surface repeatedly through additional (multiple) reflection against other surfaces (for example objects outside of the device). This portion, however, here is considered to be negligible.

The quality of the virtual light image, in particular its sharpness and brightness, depends not only on the shape of the retroreflector surface, but also on the arrangement of the retroreflector surface relative to the real light source and the semi-transparent mirror. In order to avoid the disadvantages mentioned above, which are due to the angular dependence of the retroreflection properties of the retroreflector surface, a particularly advantageous arrangement is one in which the retroreflector surface is positioned so that the point-to-point distance between the real light source and the retroreflector surface increases in the direction toward the semi-transparent mirror. Depending on the application and the respective reflection properties of the retroreflector used, though, another arrangement of the retroreflector surface and the semi-transparent mirror can also be useful.

According to one embodiment of this invention, the shape of the retroreflector surface is modeled on the shape of a cone and is implemented as a sector of the cone. In this case, the cone is defined by a cone vertex and a cone base, with a cone surface being suspended between the cone vertex and the base. The shape of the retroreflector surface essentially resembles a sector of the cone surface. In this case, the overall arrangement of the device can be described based on the imaginary cone. The semi-transparent mirror can, for example, be situated outside the cone in the immediate vicinity of or near the base and essentially parallel to the latter. The real light source can be advantageously situated inside the cone and between the cone vertex and the base. The retroreflector surface in the form of a cone sector is curved, although each direct connecting line from the cone vertex to the base along the retroreflector surface is straight. In this case, the curvature of the retroreflector surface extends perpendicular to such a connecting line. Although the arrangement of the real light source inside the cone is described as advantageous here, a different positioning of the real light source, for example outside the cone, can also be considered advantageous, depending on the application and on the properties of the light source and retroreflector.

According to one embodiment of this invention, the retroreflector surface is essentially embodied in the form of a cone sector that extends over 180 to 270 degrees. The retroreflector surface can have two recesses so that the edge of the retroreflector surface coincides with the edge of the cone base within an angular range that is less than 270 degrees or less than 180 degrees. The recesses in the retroreflector surface can, for example, facilitate the installation of the retroreflector surface in a cube-like housing of the device according to this invention. The retroreflector surface can have an opening in the vicinity of or near the cone vertex and can also deviate from the form of the cone sector by a flattened region in the vicinity of the cone vertex in order, for example, to facilitate the production of the retroreflector surface.

The retroreflector surface can also have a shape that is only curved in a plane defined by two spatial axes or directions x, y. In the direction of a third spatial axis or direction z, which is perpendicular to the two first spatial axes x, y, however, it is not curved, but rather extends in a straight line. Thus in the x-y plane, the retroreflector surface has a cross-section that does not change in the z direction. A retroreflector surface that is shaped in this way is preferably used with light sources whose dimensions in the x- and y direction are very small relative to their dimension in the z direction (preferably less than 10%).

The shape of the retroreflector surface according to this invention results from the requirement that for each point in at least a subregion of the retroreflector surface, the distance D and the angle A are Pareto-minimal. The restrictive condition (boundary condition) results from the additional requirement that the light beams that should reach a predetermined visibility range are not interrupted by the retroreflector surface.

According to one embodiment of this invention, the entire retroreflector surface does not have this property, but only the subregion of the surface that is essential for the visual properties of the virtual image. This means that, for example, edge regions or regions of the retroreflector surface facing away from the real light source can have an arbitrarily determined shape. Naturally, however, it is also possible to equip the entire retroreflector surface with the above-described property.

In order to select the best possible shape of the retroreflector surface, it is necessary to determine the desired visibility range. The visibility range is the three-dimensional region adjacent to the virtual light image from which the virtual light image should be visible. The visibility range can have a geometrical shape in space, for example a conical, semi-conical, or pyramidal shape, with the tip of the associated cone or pyramid being situated in the vicinity of or near the virtual light image. It is, however, also possible for the visibility range to define another shape in space if the respective use of the device requires this. In particular, the visibility range usually depends on the expected position of the observer by whom the virtual light image is supposed to be perceived. The determination of the visibility range dictates the requirements of the shape of the retroreflector surface, according to which the primary beams from the real light source to the semi-transparent mirror, which should finally travel into the visibility range, should not be interrupted by the retroreflector surface.

In this case, the distance D and the angle A have been established as suitable parameters because they are particularly relevant to the sharpness and luminosity of the virtual light image. If the vector (A, D) composed of the two parameters A and D has the property of being Pareto-minimal, then this means that it is not possible to improve both components A and D of the vector at the same time through a particular choice of the shape of the retroreflector surfaces. In this case, an improvement is achieved by reducing the distance D or the angle A. For this reason, an optimal choice of the parameters means that D and A are minimal, with the given restrictions as described above. From the definition of the Pareto minimum, it is clear that a choice of two Pareto-minimal parameters A and D and thus of the shape of the retroreflector surface (at a given point on the surface) is not necessarily the only possible choice. Instead, for each point on the retroreflector surface, there are a number of vectors (A, D) that satisfy the predetermined requirements (Pareto-minimal+boundary condition). The selection of a specific shape of the retroreflector surface based on this quantity can be made according to additional criteria such as possible structural requirements of the device or also productions costs and the like. It is also possible to make the choice by minimizing a predetermined optimization function f, such as $f=wd*D^2+wa*A^2$, where the weighting factors wd and wa can suitably assume any arbitrary non-negative value.

A useful choice of the function f and the weighting factors wa and wd can also be made as a function of the reflection properties of the retroreflector surface. For example, glass bead retroreflectors have good angular reflection characteristics. In other words, they function in a relatively large angular range so that it is possible to set wd=1 and wa=0. On the other hand, triple-mirror retroreflectors have relatively good sharpness characteristics and relatively bad angle characteristics in the image so that in this case, a choice of wa>0 and wd>0, e.g. wd=1, wa=2, can be useful. In particular, the weights can be selected so that for wd after standardization, 0<wd<1, where the weights are standardized if wa+wd=1. Other forms of the function f aside from those mentioned here can be advantageous under certain circumstances, for example $f=wd*D^2+wa*D^2*\tan^2 A$, which weights the angle term $wa*D^2*\tan^2 A$ more heavily with a greater D and with the retroreflector surface in a tangential position relative to the incoming beams.

For example, by specifying horizontal and/or vertical angular ranges of the visibility range, it is likewise possible to integrate the magnitude of the visibility range into the function f as a for example, additional factor through the use of a suitable weighting factor.

The retroreflection against the retroreflector surface is not ideal. Instead, only a portion of the light beams is reflected precisely in the direction from which they come. Another portion of the beams is reflected in accordance with the usual law of reflection. These beams are thus governed by the equation according to which the incidence angle of the light beam is equal to the emergence angle of the light beam. If the beams that are reflected according to the law of reflection travel into the visibility range, then this has a negative influence on the image quality of the virtual light image. There is thus a further improvement in the virtual light image if the vector (A, D) is Pareto-minimal under the additional condition that light beams, which are reflected by the retroreflector surface in accordance with the law of reflection, do not travel into the visibility range.

In order to determine the quantity of Pareto-minimal vectors (A, D) and to select a specific shape of the retroreflector surface based on this quantity, it is possible to use one of the customary analytical and/or numerical methods of multiple criteria optimization.

For example, the above-described cone results in a Pareto-minimal retroreflector surface if one assumes that a real light source in the form of a point is situated at or in the vicinity of or near the cone vertex and if the weighting factors are set to wd=1 and wa=0. Other examples of Pareto-minimal retroreflector surfaces are shown in FIGS. 8 and 9.

In practice (for example due to production tolerances), it is possible according to this invention for there to be not only surfaces that are exactly Pareto-minimal, but also surfaces that are basically Pareto-minimal. For purposes of this invention, shape deviations of less than 15 percent from the exactly Pareto-minimal form should be considered Pareto-minimal. Stricter boundaries of acceptable shape deviations are 10 or even 5 percent.

For particular uses of the device according to this invention, it can be advantageous if an observer of the virtual light image does not perceive the light coming directly from the real light source. Since the real light source appears to be brighter than the virtual light image, it can be irritating for the observer to see both light sources (the real one and its virtual image) simultaneously. In order to avoid this disadvantage, the device can be provided with a shield, which is situated for example in the vicinity of the real light source. The shield covers the real light source so that for the light beams that are supposed to reach the predetermined visibility range, the light path from the real light source to the semi-transparent mirror is left as uncovered as possible for the observer positioned in the visibility range, but the real light source is not visible. A direct light beam that can travel from the real light source into the predetermined visibility range is interrupted by the shield.

To facilitate determination of the shape of the retroreflector surface, the real light source can be assumed to be approximately in the form of a point. For a multitude of uses of the device according to this invention, however, there can be suitable real light sources with an expanded distribution of light. For example, the virtual light image can be designed to display an inscription, an image, or the like, which requires a corresponding configuration of the real light source. According to one exemplary embodiment of this invention, the real light source includes an optical diffusor, which is provided to make the light of a lighting element such as an LED as homogeneous as possible. Between the lighting element and the diffusor, there can also be a tube-like reflector, with the lighting element at one end and a light dispersion element at the other end. The tube-like reflector can be made of a mirror material or of a diffusely reflecting material and serves to increase the output brightness and homogeneity. The real light source can also include an alpha mask, where the alpha mask is situated between the lighting element and the semi-transparent mirror. The alpha mask has regions of high light transmissivity and/or regions of low light transmissivity. The alpha mask serves to control the light coming from the lighting element so as to produce a desired transparency image. It is thus possible, for example, to give the virtual image the shape of an inscription, an illuminated sign, a pictogram, or the like. For some uses of the device, such as in advertising, it is advantageous if the virtual light image can be visually decorated.

According to another embodiment of this invention, the device also includes a sensor element. The sensor element can be situated suitably close to the real light source and be aimed at the virtual light image. The sensor element is provided to react to an object that is situated spatially in the vicinity of or near the virtual light image. The provision of a sensor element makes it possible for the device to be used as a virtual switch. In this case, the sensor element can be configured so that the detection of the object produces a trigger signal. For example, the object can be the tip of a finger that is being moved in the vicinity of the virtual light image. The trigger signal can then, for example, produce a change in the state of the real light source so that, for example, the real light source radiates light of a different color. The trigger signal can, however, also produce a switching event in the device itself or in a unit connected to the device. The use of the device according to this invention as a switch enables a contactless switching, in particular a switching on and/or off, which can be carried out merely by moving the object in the vicinity of or near the virtual light image. This can be advantageous for many safety-relevant uses in which a corresponding mechanical switch is situated in a hard-to-reach and/or dangerous location.

The sensor element can, for example, be embodied as a passive or active sensor. The passive sensor can be embodied so that it can react to changes in the luminosity that is emitted by the virtual light image in the direction of the sensor. In this case, the passive sensor can be particularly sensitive in a given frequency range of the radiation. The active sensor has a transmitter element and a receiver element. The transmitter element and the receiver element are oriented toward the spatial region of the virtual light image so that the radiation emitted by the transmitter element is reflected by the object that is situated at the location of the virtual light image. The receiver element can then register the radiation reflected by the object in the direction of the receiver element. In order to achieve the most precise possible orientation of the transmitter element toward the location of the virtual light image and a shielding from interfering external radiation, the sensor element can include an absorber mask. The sensor element can use infrared radiation or any other suitable type of radiation. It can be embodied as a photosensor, a triangulation sensor, or as another suitable type of sensor such as a photoelectric barrier or a time-of-flight sensor.

According to another exemplary embodiment of this invention, the device includes a second retroreflector surface. The second retroreflector surface is arranged so that the semi-transparent mirror is situated between the real light source and the retroreflector surface. The second retroreflector surface serves to reflect the portion of the light, which is emitted by the real light source in the direction of the semi-transparent mirror and which the semi-transparent mirror allows to pass through and would thus otherwise be lost for the production of the virtual light image. The light reflected by the second retroreflector surface is partially reflected by the semi-transparent mirror and thus contributes to the production of the virtual light image. It is thus possible to achieve an additional improvement in the luminosity of the virtual light image.

A further improvement can be achieved if the shapes of the two retroreflector surfaces are essentially the same as each other and the two retroreflector surfaces are arranged symmetrically with regard to the semi-transparent mirror. The above-described advantages of the retroreflector surface with regard to its imaging properties can thus correspondingly also be transferred to the second retroreflector surface.

According to one embodiment of this invention, the device according to this invention includes an object that is arranged so that it is visible together with the virtual light image from an observation position. The object can be an arbitrarily shaped item. It can be situated in the vicinity of or near the virtual light image, between the semi-transparent mirror and the virtual light image, or also between the semi-transparent mirror and the retroreflector. A suitable placement of the object is any placement that enables a visual cooperation of the object and the virtual light image. It is thus possible to display a so-called augmented reality. In this case, a real object is superimposed by a light effect that appears to be encompassing it in space.

To further intensify the visual impression of the virtual light image, the device according to this invention can be provided with a haptic element. With the haptic element, an action of force is produced at the location of the virtual light image or in its vicinity or near it so that the action of force is exerted on the object that is guided into the vicinity of or near the virtual light image. It is thus possible to simulate a haptic perception of the virtual light image. The haptic element can, for example, be embodied in the form of an electronically controlled air pump. If an object approaches the location of the virtual light image, then the air pump produces an air flow that is directed against the movement of the object so that with the counteracting force, a feeling of relative solidity can be perceived.

BRIEF DESCRIPTION OF THE DRAWINGS

This invention is explained in greater detail below in view of FIGS. 1 though 9.

DETAILED DESCRIPTION OF THE INVENTION

Figure 1:
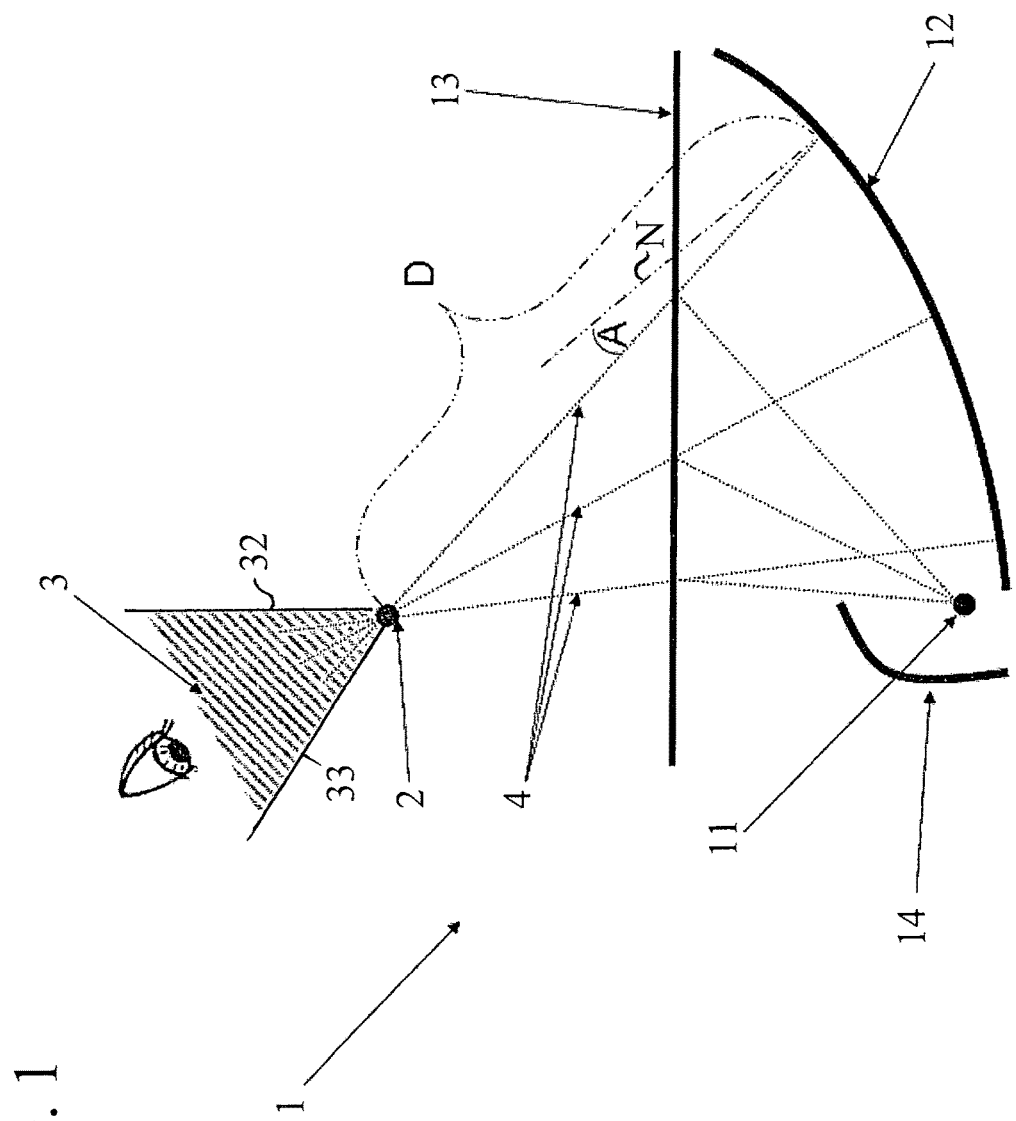
FIG. 1 is a schematic diagram of a device according to this invention to illustrate how it works.

In particular, FIG. 1 is a schematic depiction of the arrangement of an exemplary embodiment of a device according to this invention 1. The schematic depiction is provided to permit an explanation of how the device 1 works. The device 1 includes a real light source 11, a retroreflector surface 12, and a semi-transparent mirror 13. The light path of a portion of the light emitted by the real light source 11 is schematically represented by the beam paths or light beams 4 in the form of dotted lines 4. The light emitted by the real light source 11 in the direction of the semi-transparent mirror 13 is then partially reflected by the mirror 13. From there, the beams 4 travel to the retroreflector surface 12. The retroreflector surface 12 reflects the beams 4 in the opposite direction, back to the semi-transparent mirror 13. The mirror allows a portion of these beams to pass through. The beams 4 that have been allowed to pass through and intersect at a point and thus establish the location of a virtual light image 2. An observer situated in a visibility range 3 is therefore given the impression of a light source situated at this location. Assuming that the semi-transparent mirror 13 is situated on the horizontal, the visibility range 3 is delimited by a first, vertically extending line 32 (perpendicular to the mirror 13) and by a second line 33. In FIG. 1, the second line 33 is inclined by approximately 60° relative to the first line 32 or to the vertical. The angle between the lines 32, 33 can also assume other values. In addition, the first line 32, which is perpendicular to the (horizontal) mirror 13 in the exemplary embodiment shown in FIG. 1, can deviate from the vertical and be correspondingly inclined toward the left or right, in the depiction in FIG. 1.

The luminosity of the virtual light image 2 is less than the luminosity of the real light source 11, among other things because a portion of the light of the real light source is lost when it is reflected against the semi-transparent mirror 13 and the light is not ideally retroreflected at the retroreflector surface 12. For this reason, the device 1 also includes a shield 14, which serves to prevent the perception of the real light source 11 by the observer in the visibility range 3.

Figure 2:
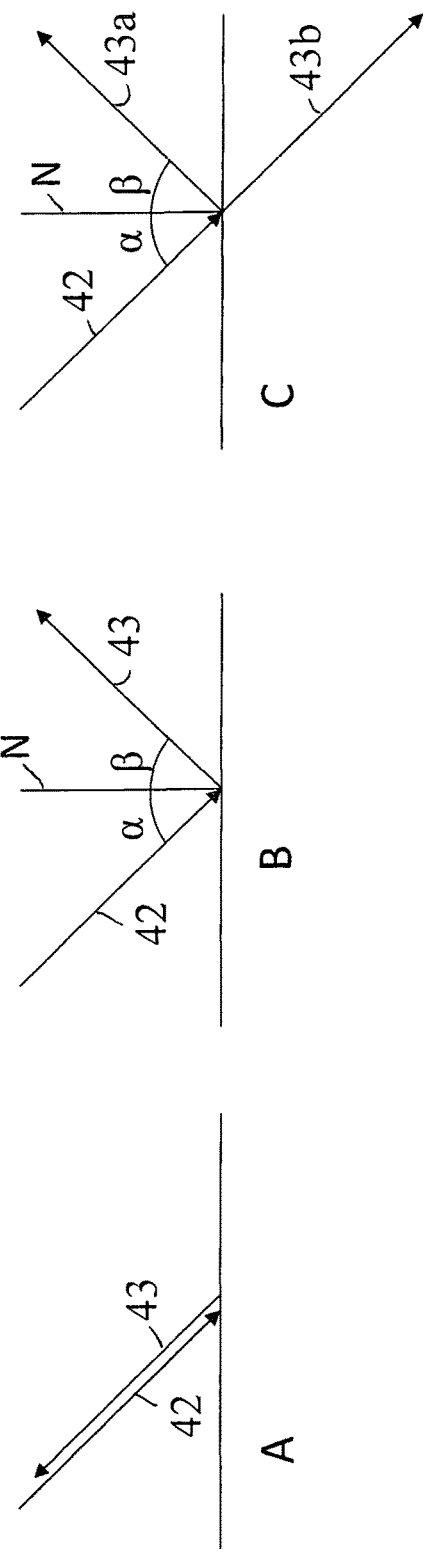
FIG. 2 schematically shows incoming and outgoing beams of light striking a retroreflector surface, a mirror, and a semi-transparent mirror.

Before going into further detail about the device according to this invention in FIG. 1, it is first necessary to demonstrate the basic differences between a retroreflector surface, a mirror, and a semi-transparent mirror shown in FIG. 2. In retroreflection against a retroreflector surface (see FIG. 2A), which is provided with the reference numeral 12 as in FIG. 1, an incoming or incident light beam 42 is reflected back in the direction from which the light beam 42 comes. Correspondingly, a light beam labeled 43 coincides with the incoming light beam 42 and the light beams 42, 43 are oriented in opposite directions from each other. FIG. 2B shows the beam path according to the usual law of reflection against a mirror 5. The incident or incoming light beam 42, the emergent or outgoing light beam 43, and a normal N at the incidence point of the light on the surface of the mirror 5 lie in a plane, where an angle α between the incident light beam 42 and the normal N corresponds to an angle β between the normal N and the emergent light beam 43. The emergent light beam 42 and the incident light beam 43 in this case are situated on opposite sides of the normal N. FIG. 2C shows the reflection against a semi-transparent mirror 13. By contrast with the reflection against the mirror according to FIG. 2B, the incident light beam 42 is only partially reflected according to the usual law of reflection so that a reflected emergent light beam 43a is produced according to the usual law of reflection. A certain portion of the incident light beam 42 is allowed to pass through, which results in a light beam 43b. The incident light beam 42 and the light beam 43b are aligned along a line and point in the same direction.

Returning to FIG. 1 again, the retroreflection against the retroreflector surface 12 is in particular better, in the sense that a greater portion of the reflected light can contribute to producing the virtual light image 2, and in the sense that the virtual light image 2 is produced as sharply as possible, the shorter the distance D between a given point on the retroreflector surface and the virtual light image 2 is and the smaller the angle A between the light beam 4 and a normal vector or the normal N at the point on the retroreflector surface is.

The retroreflector surface 12 has a curved shape. The curved shape of the retroreflector surface 12 can improve the luminosity and sharpness of the virtual light image 2 as compared to a flat shape. The retroreflector surface 12 is positioned relative to the real light source 11 and the semi-transparent mirror 13 in such a way that beams coming directly from the light source 11, which the mirror 13 allows to pass through, can no longer reach the retroreflector surface 12. In this case, other reflections and diffusion against objects outside the depicted parts of the device 1 are ignored.

A suitable shape of the retroreflector surface 12 can be achieved by selecting the two values A and D for each point on the retroreflector surface 12 that are minimal from a Pareto standpoint.

In order to determine the Pareto-optimal shape of the retroreflector surface 12, it is necessary to determine the visibility range 3. This specification simultaneously defines a boundary condition according to which the primary beams from the real light source 11 to the semi-transparent mirror 13, which finally reach the visibility range 3, must not be interrupted by the retroreflector surface 12.

Figure 3:
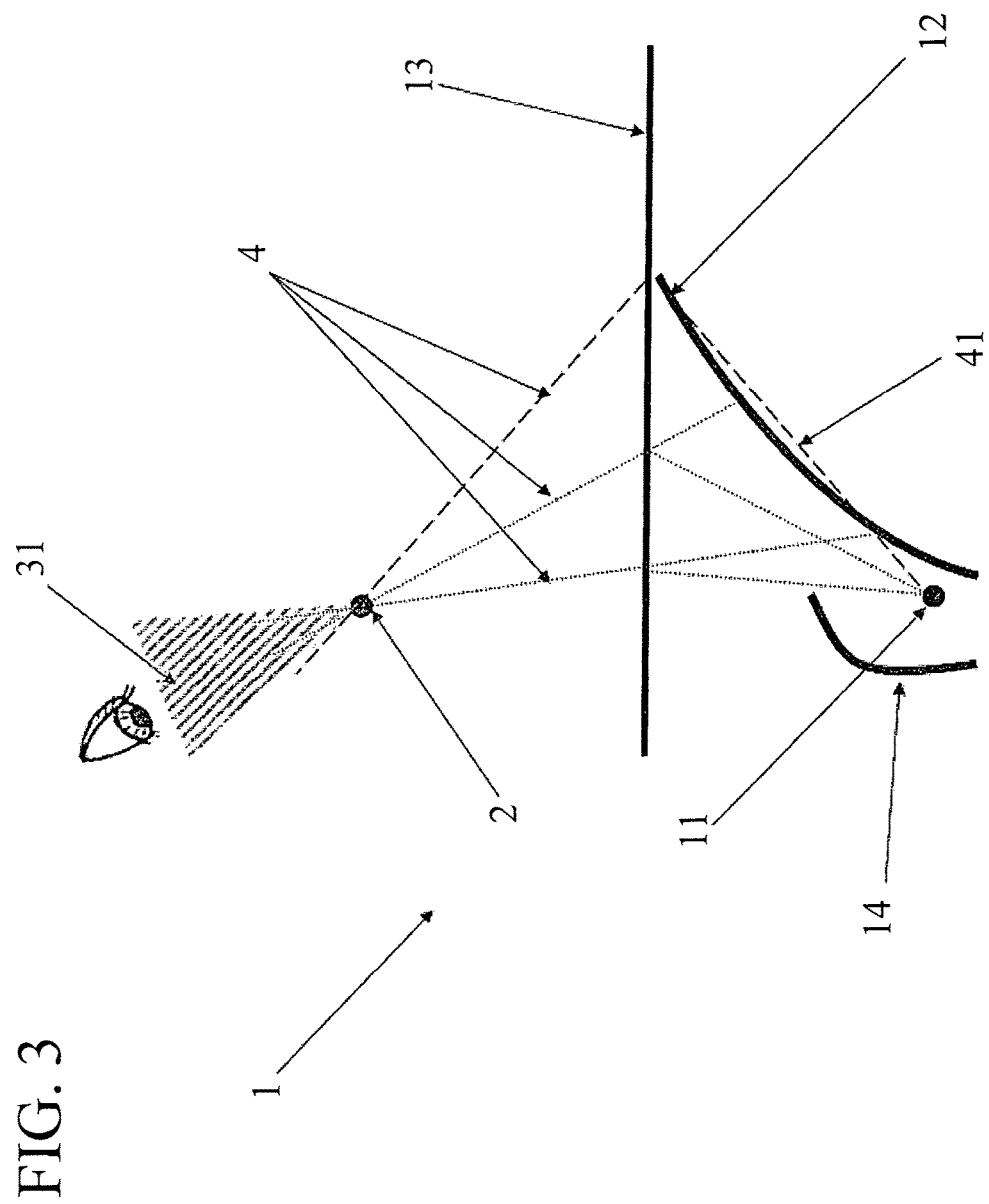
FIGS. 3 and 4 are schematic diagrams of two other embodiments of the device according to this invention.

FIG. 3 is a schematic depiction of another embodiment of the device 1.

Elements that are the same or equivalent in FIGS. 1 and 2 have therefore been provided with the same reference numerals. The same is true for all of the figures below.

The shape of the retroreflector surface 12 in FIG. 3 is different from the one in FIG. 1. The shape in FIG. 3 produces shorter respective distances D for the beam paths 4. But in the arrangement shown in FIG. 3, if the visibility range 3 from the arrangement in FIG. 1 were preset in order to establish the Pareto-optimal shape of the retroreflector surface 12, then the shape of the retroreflector surface in FIG. 3 could not fulfill the resulting boundary condition. A beam path 41 from the light source 11 to the semi-transparent mirror 13 is interrupted by the retroreflector surface 12. This yields the visibility range 31, which is restricted in comparison to the visibility range 3 in FIG. 1. Consequently, the shape of the retroreflector surface 12 shown in FIG. 3 cannot be considered to be Pareto-optimal provided that it has the visibility range 3 from FIG. 1 (but at most provided that it has the restricted visibility range 31).

Figure 4:
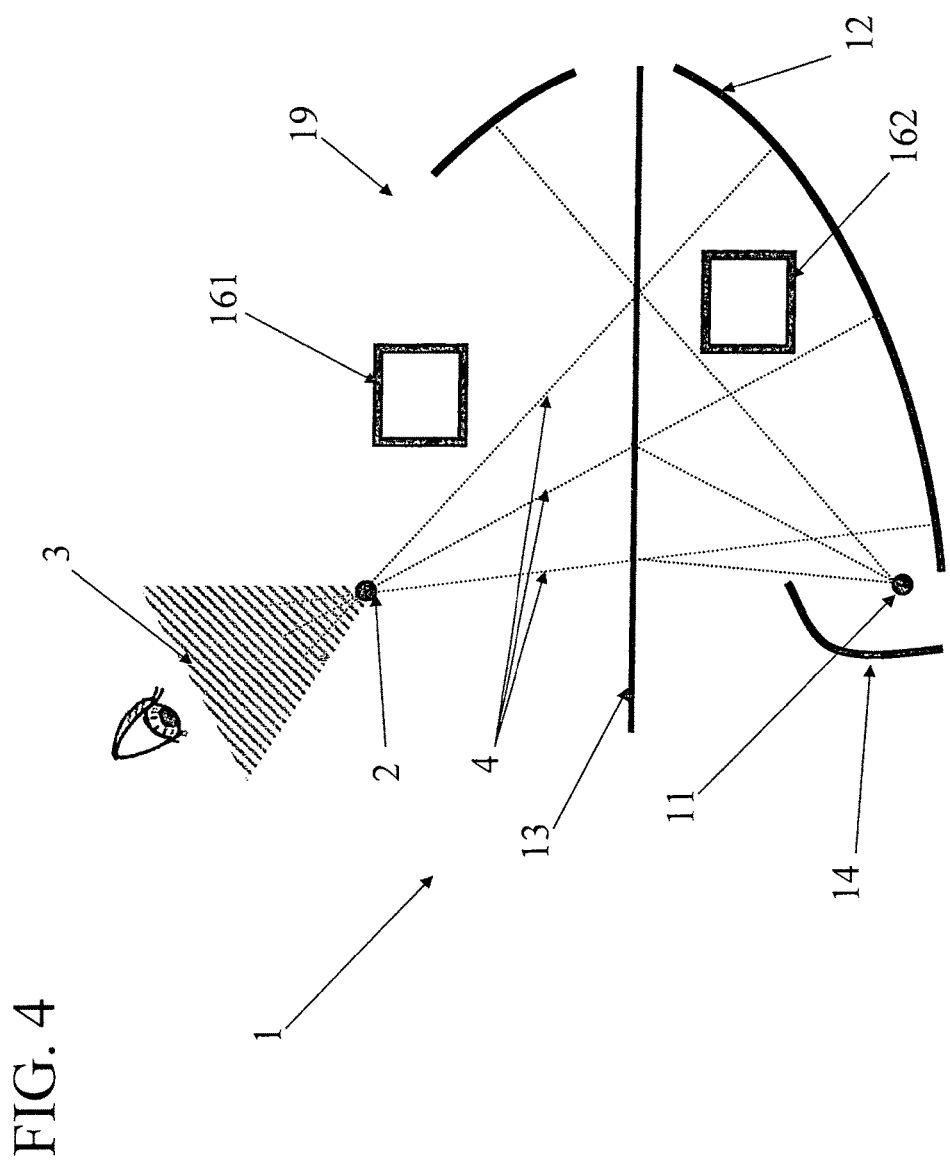

FIG. 4 schematically depicts another exemplary embodiment of the device according to this invention 1. The device 1 includes a second retroreflector surface 19, which is situated on the opposite side of the semi-transparent mirror 13 from the retroreflector surface 12.

The device 1 also has two objects 161, 162. Viewed from the visibility range 3, the objects 161, 162 visually combine with the virtual light image 2 to produce an overall visual impression. The object 161 is situated essentially next to or near the location of the virtual light image 2 so that the light beams of the real light source 11 that produce the virtual light image are not blocked or interrupted by the object 161. The object 162 is situated between the semi-transparent mirror 13 and the retroreflector surface 12. Some of the light beams 4 of the light source 11 that are retroreflected by the retroreflector surface 12 are interrupted by the object 162 so that they cannot contribute to the production of the virtual light image 2. The light coming from the light source 11 and transmitted by the semi-transparent mirror 13, however, is retroreflected by the second retroreflector surface 19 so that it can contribute to producing the virtual light image 2. In this way, the reduction in luminosity or an interruption of the light image 2 due to the selected positioning of the object 162 can be at least partially compensated for again by the second retroreflector surface 19. The second retroreflector surface 19 can also be omitted if one accepts a reduced sharpness of the light of the virtual light image.

Figure 5:
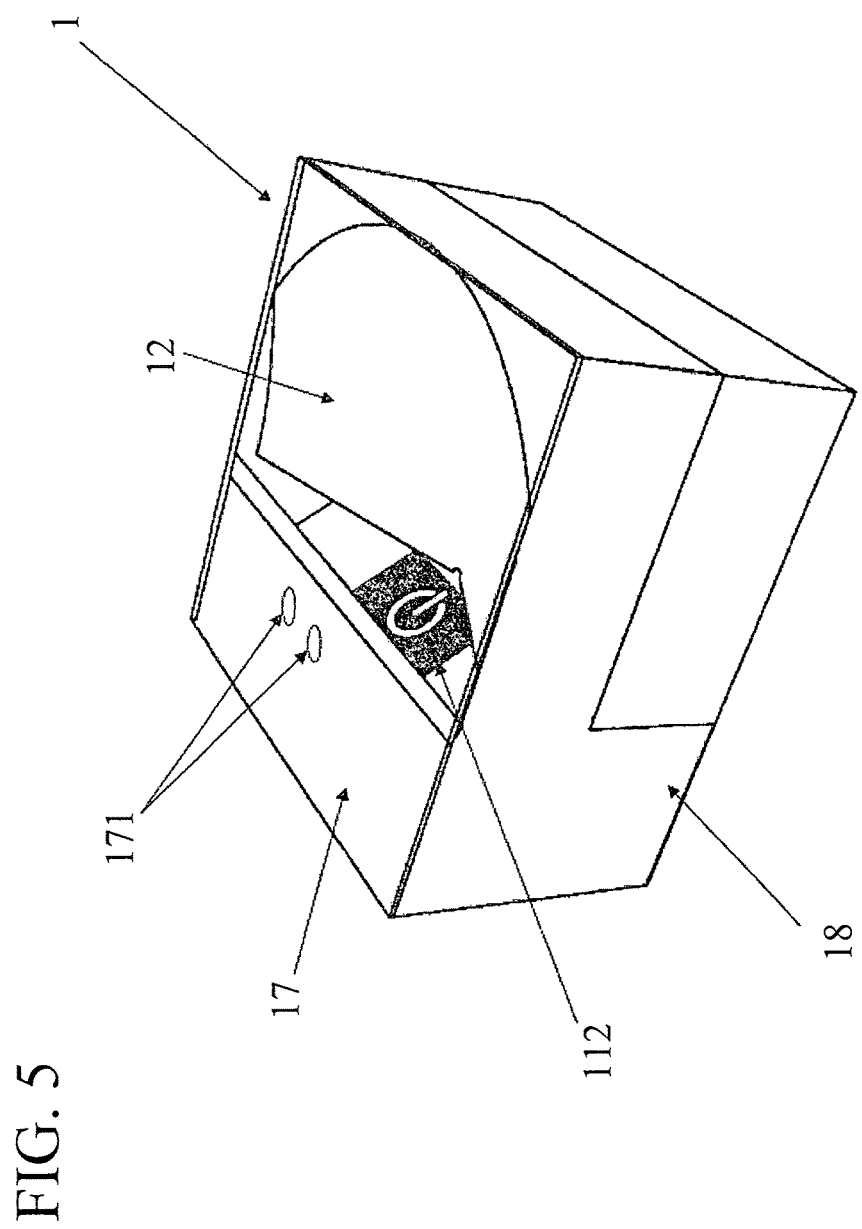
FIG. 5 is a perspective view of an exemplary embodiment of the device according to this invention.

FIG. 5 is a perspective external view of an embodiment of the device according to this invention 1. The device 1 includes the real light source with a diffusor and an alpha mask 112. In the depiction in FIG. 5, only the alpha mask 112 is visible. The alpha mask 112 has regions of different transmissivity. The regions of higher transmissivity produce a pictogram which displays the usual switching times for electronic devices.

The device 1 also includes the retroreflector surface 12, a box-shaped housing 18, and a cover 17. The semi-transparent mirror is situated parallel to the cover 17 and above the retroreflector surface 12, but is not visible in this depiction. The device 1 also includes a sensor element that is situated under the cover 17 and is therefore not visible in the depiction in FIG. 5. Two openings 171 in the cover 17 provide accesses to a transmitter element and a receiver element of the sensor element 15.

If an object is moved to the location of the virtual light image (not shown in this view), then the beams emitted by the transmitter element of the sensor element 15 through one of the openings 171 in the direction of the virtual light image are reflected against the surface of the object so that at least some of them travel through the other of the openings 171 to the receiver element of the sensor element 15 and are registered there. The sensor element 15 can then generate a trigger signal, which is forwarded, for example as a switching signal, to a corresponding control unit.

Figure 6:
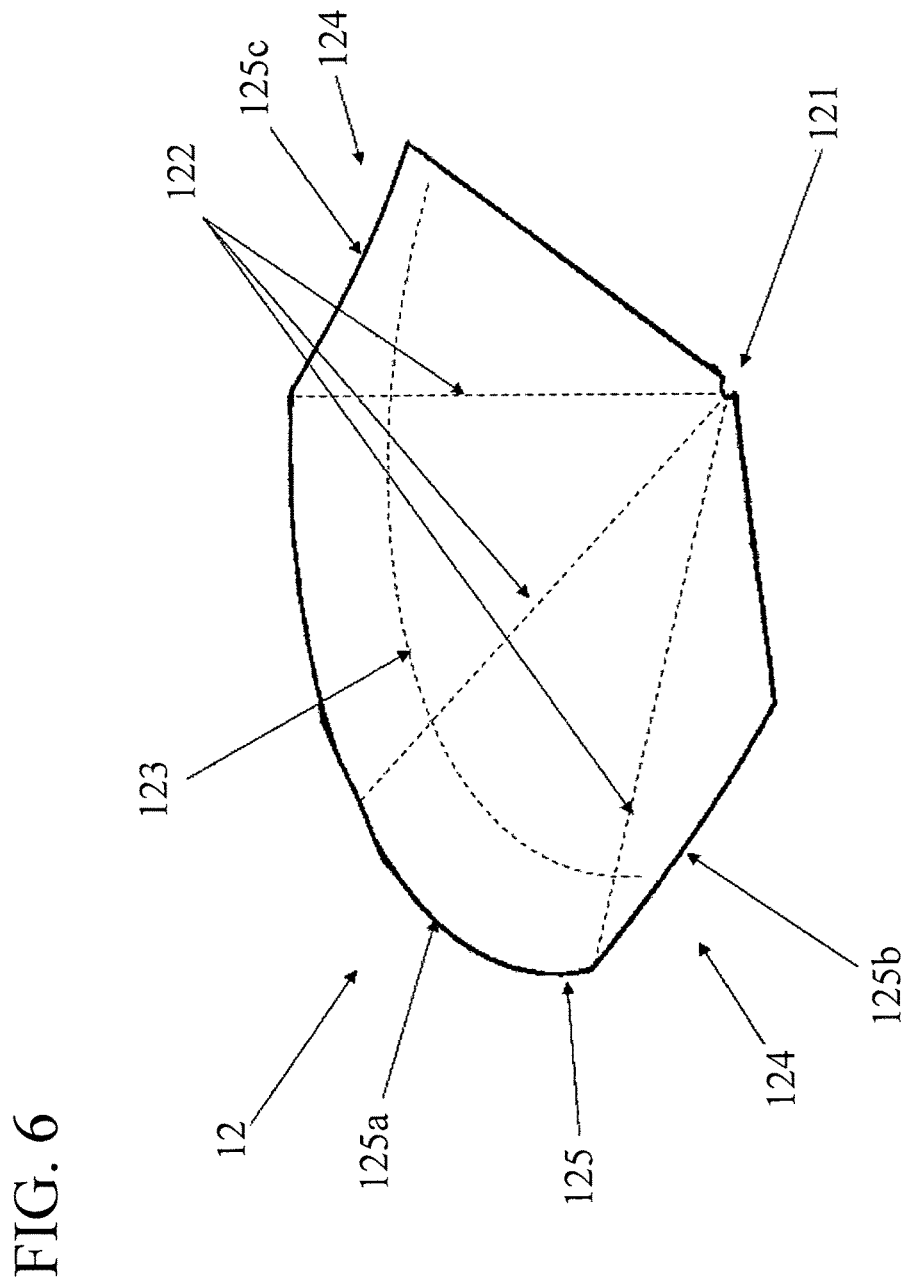
FIG. 6 shows a retroreflector surface of the device from FIG. 5.

FIG. 6 is a perspective depiction of the retroreflector surface 12 of the device 1 from FIG. 5. The shape of the retroreflector surface 12 is formed by a sector of a cone with a cone vertex, a base, and a cone surface suspended between the cone vertex and the base. A part 125*a* of the edge 125 of the retroreflector surface 12 partially coincides with the edge of the base of the imaginary cone. In the vicinity of or near the cone vertex 121, there is an opening in the retroreflector surface 12. The retroreflector surface also has two recesses 124, which constitute subregions 125*b*, 125*c* of the edge 125. The cone sector constituting or forming retroreflector surface extends over an angular range of approximately 180 degrees. The curved edge 125 and the edge of the cone base coincide along an angular range that is less than 180 degrees and is approximately 90 degrees in the depiction in FIG. 5.

The lines 122 and 123 shown in FIG. 6 are provided to indicate the course of the cone sector of the retroreflector surface. The connecting lines 122 between the cone vertex 121 and the edge 125 are each defined by a straight line. The retroreflector surface 12 is curved along the line 123.

Figure 7:
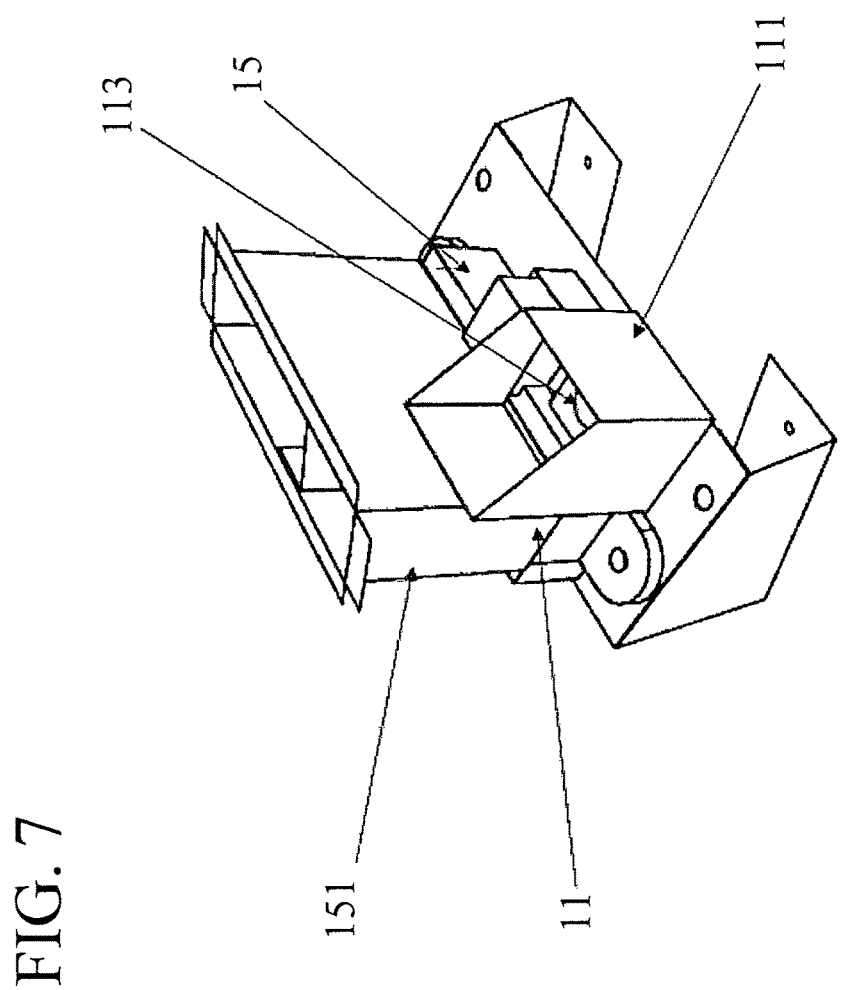
FIG. 7 shows a partial view of the device according to this invention from FIG. 5.

FIG. 7 is a perspective partial view of the device according to this invention 1 from FIG. 5. The sensor element 15 and the real light source 11 are visible in this depiction. The light source 11 includes an LED for producing light and a diffusor 111. In this case, only a tube-like reflector of the diffusor is visible. The sensor element 15 is situated in the immediate vicinity of or near the light source 11 and includes an aligner 151 comprising two ducts. The sensor element is embodied in the form of an active IR sensor equipped with a transmitter element and a receiver element. The aligner 151 serves to direct the radiation emitted by the transmitter element of the sensor element as precisely as possible toward the location of the virtual light image and to correspondingly protect the radiation received by the receiver element from interfering influences as much as possible. The openings of the aligner 151 shown at the top in FIG. 7 feed into the openings 171 in the cover 17, which are not visible in FIG. 7.

Figure 8:
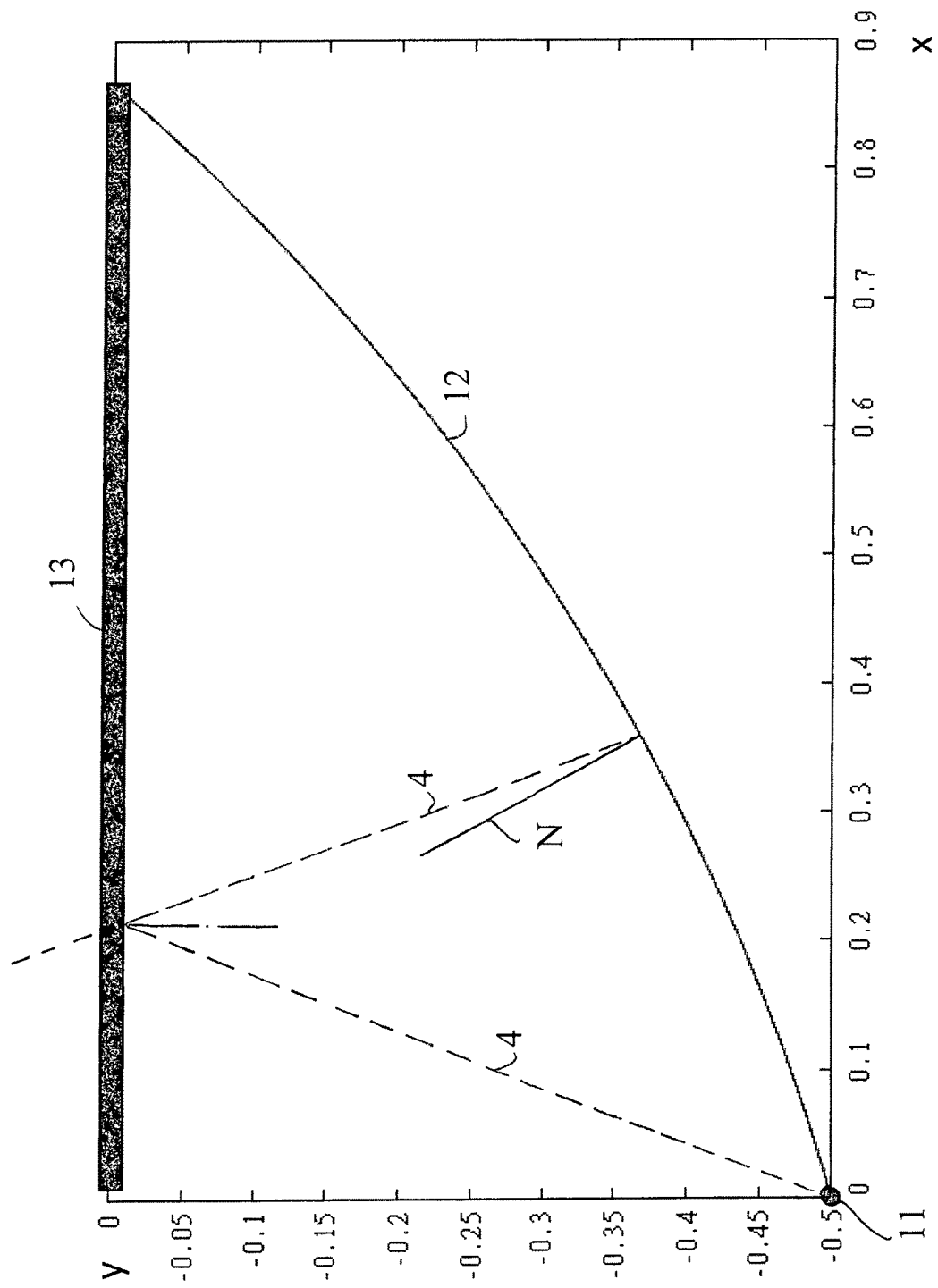
FIG. 8 shows a cross-section taken though a retroreflector surface in another embodiment.

FIG. 8 shows a cross-section taken through another embodiment for a Pareto-minimal retroreflector surface 12. It is used, for example, in a device in which the real light source 11 has an elongated form so that its length is much greater than its size perpendicular to this (for example such a light source could be an LED ticker or an LED chain). In the depiction in FIG. 8, the light source 11 extends perpendicular to the plane of the drawing and down into the plane of the drawing, such as perpendicular to the plane that is defined by the axes x and y. The light source 11 is situated at the point with the coordinates x=0 and y=−0.5. The semi-transparent mirror 13 extends parallel to the x axis at y=0. The retroreflector surface 12 is therefore defined by the following functions:

$$x = r(t) \cdot \sin(t)$$
$$y = -r(t) \cdot \cos(t) + 0.5$$

where $$0 \leq t \leq \frac{\pi}{3};$$

$$r(t) = \cosh\left(\sqrt{\frac{wd}{wa}} \cdot t + B\right) \Big/ \cosh(B);$$

$$B = 0.5 \cdot \ln\frac{1 - e^{-C}}{e^C - 1};$$

$$C = \frac{\pi}{3} \cdot \sqrt{\frac{wd}{wa}}.$$

In the exemplary embodiment of FIG. 8 shown here, the values wd=1 and wa=2 have been selected for the retroreflector surface 12 and the function y(x). The visibility range (not shown) should be delimited by a first line perpendicular to the mirror 13 and a second line that is inclined by 60° relative to the first line.

Figure 9:
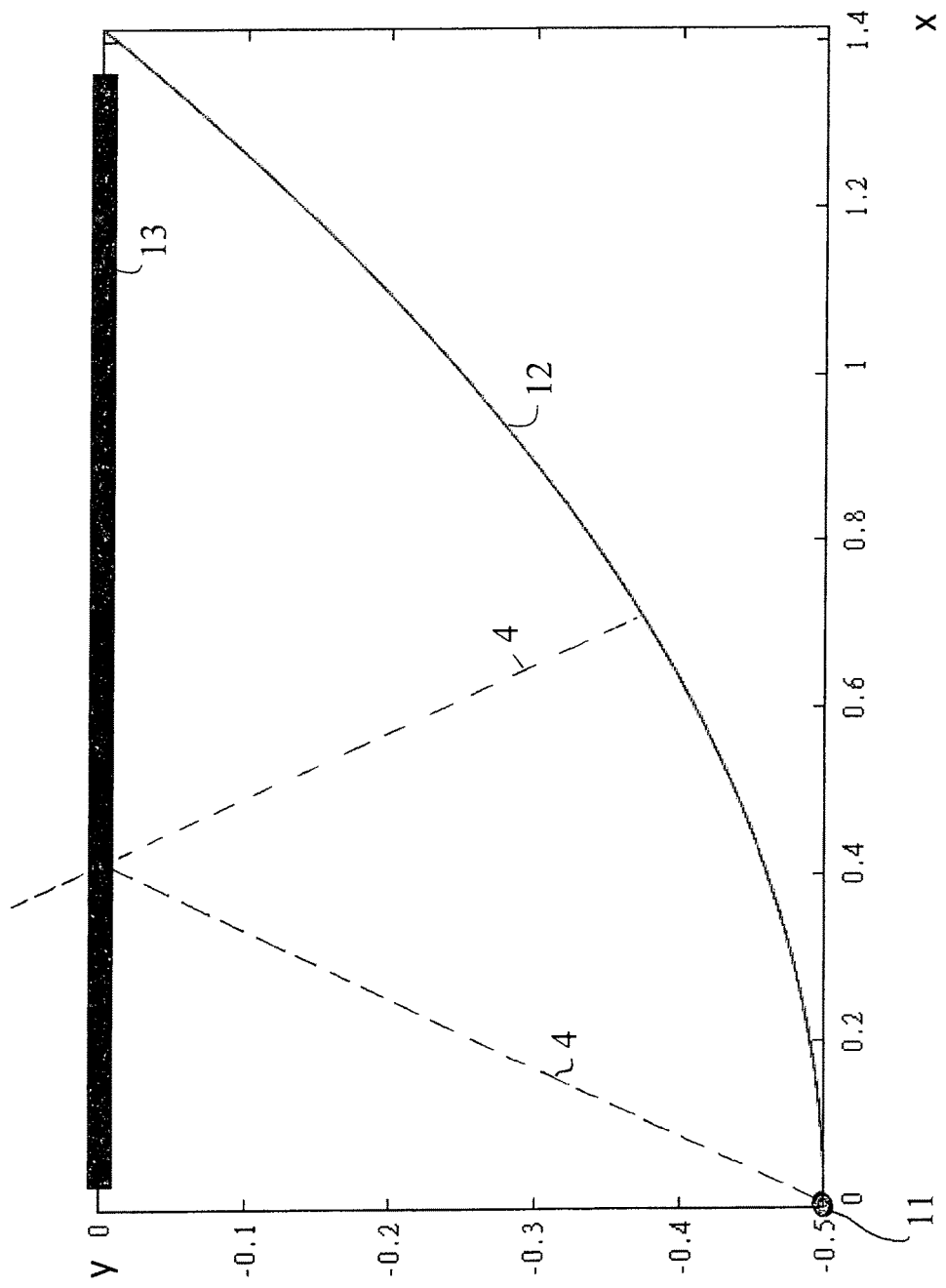
FIG. 9 shows a cross-section taken through another retroreflector surface.

FIG. 9 shows another proposed embodiment of the retroreflector surface 12 for the same light source 11 as in FIG. 8. The light source 11 and semi-transparent mirror 13 are arranged in the same way as in the exemplary embodiment in FIG. 8. The retroreflector surface is defined by the function:

$$y = 0.25 \cdot x^2 - 0.5$$

where $$0 \leq x \leq 1.4.$$

The visibility range (not shown) of FIG. 9 should then be delimited by the vertical (perpendicular to the semi-transparent mirror) and a line that is inclined by 70° in relation to it. The weighting factors have been set to wd=1 and wa=0. The retroreflector surface 12 can have a glossy or mirror-like surface. All of the light beams that are reflected by the mirror-like retroreflector surface 12 in addition to the actual retroreflection according to the usual law of reflection do not travel into the visibility range 3.

In the exemplary embodiments above, the shape of the retroreflector surface 12 can be changed by an adaptation factor. The curves of FIGS. 8 and 9 can be used as production templates for optimum retroreflector surfaces. A shared property of the above embodiments lies in the fact that the retroreflector surface can be embodied in the form of a developable surface. It can be cut out from a flat sheet and then bent into the desired shape without warping. This facilitates the production of the devices according to this invention presented here.

The invention claimed is:

1. A device (1) for generating a virtual light image (2), including at least one real light source (11), one curved retroreflector surface (12), and one semi-transparent mirror (13) and a light of the real light source (11) transmitted through the semi-transparent mirror (13) not reaching the retroreflector surface (12), the device comprising a shape of the retroreflector surface (12) for a visibility range (3), at least in a subregion of the area (12) essential for the image in the visibility range (3), determined by at each point of the subregion, a pair (A, D) of a reflection angle A and an optical distance D between the point of the subregion of the retroreflector surface (12) and the virtual light image (2) being Pareto-minimal, and the subregion of the retroreflector surface (12) not interrupting primary beams from the real light source (11) to the semi-transparent mirror (13), wherein the reflection angle A is formed by a portion of light reflected from the semi-transparent mirror (13) and incident to the retroreflector surface (12) and a normal at a point of incidence on the retroreflector surface (12).

2. The device (1) according to claim 1, wherein the pair (A,D) is Pareto-minimal and the light beams which the retroreflector surface (12) reflects according to a law of reflection, do not travel into the visibility range (3).

3. The device (1) according to claim 2, wherein the shape of the retroreflector surface (12) resembles a sector of a cone, where the real light source (11) is situated inside the cone and between a vertex of the cone (121) and the semi-transparent mirror (13).

4. The device (1) according to claim 3, wherein the retroreflector surface (12) has the shape of a sector of a cone extending over 180 degrees, with a cone vertex (121) and a cone base, where the retroreflector surface (12) has two recesses (124) so that an edge (125) of the retroreflector surface (12) coincides with an edge of the cone base in an angular range that is less than 180 degrees.

5. The device (1) according to claim 2, wherein the real light source is essentially an elongated light source extending in a longitudinal direction, where the retroreflector surface (12) has a uniform cross-section in a plane perpendicular to the longitudinal direction.

6. The device (1) according to claim 5, wherein the device (3) also includes a shield (14) for shielding the real light source (11).

7. The device (1) according to claim 6, wherein the real light source (11) includes a diffusor (111) and an alpha mask (112).

8. The device (1) according to claim 7, wherein the device (1) includes a sensor element (15) detecting objects located in an immediate vicinity of the virtual light image (2).

9. The device (1) according to claim 8, wherein the device (1) includes a second retroreflector surface (19) and the semi-transparent mirror (13) is situated between the real light source (11) and the second retroreflector surface (19).

10. The device (1) according to claim 9, wherein the two retroreflector surfaces (12, 19) have a same shape and are arranged symmetrically with regard to the semi-transparent mirror (13).

11. The device (1) according to claim 10, wherein the device (1) includes an object (161, 162) situated so that it is visible together with the virtual light image (2).

12. The device (1) according to claim 11, wherein the device (1) also includes a haptic element which is able to produce a corresponding haptic perception when the virtual light image (2) is touched.

13. The device (1) according to claim 12, wherein the haptic element is an electronically controlled air pump.

14. The device (1) according to claim 1, wherein the shape of the retroreflector surface (12) resembles a sector of a cone, where the real light source (11) is situated inside the cone and between a vertex of the cone (121) and the semi-transparent mirror (13).

15. The device (1) according to claim 1, wherein the retroreflector surface (12) has the shape of a sector of a cone extending over 180 degrees, with a cone vertex (121) and a cone base, where the retroreflector surface (12) has two recesses (124) so that an edge (125) of the retroreflector surface (12) coincides with an edge of the cone base in an angular range that is less than 180 degrees.

16. The device (1) according to claim 1, wherein the real light source is essentially an elongated light source extending in a longitudinal direction, where the retroreflector surface (12) has a uniform cross-section in a plane perpendicular to the longitudinal direction.

17. The device (1) according to claim 1, wherein the device (3) also includes a shield (14) for shielding the real light source (11).

18. The device (1) according to claim 1, wherein the real light source (11) includes a diffusor (111) and an alpha mask (112).

19. The device (1) according to claim 1, wherein the device (1) includes a sensor element (15) detecting objects located in an immediate vicinity of the virtual light image (2).

20. The device (1) according to claim 1, wherein the device (1) includes a second retroreflector surface (19) and the semi-transparent mirror (13) is situated between the real light source (11) and the second retroreflector surface (19).

21. The device (1) according to claim 20, wherein the two retroreflector surfaces (12, 19) have a same shape and are arranged symmetrically with regard to the semi-transparent mirror (13).

22. The device (1) according to claim 1, wherein the device (1) includes an object (161, 162) situated so that it is visible together with the virtual light image (2).

23. The device (1) according to claim 1, wherein the device (1) also includes a haptic element which is able to produce a corresponding haptic perception when the virtual light image (2) is touched.

24. The device (1) according to claim 23, wherein the haptic element is an electronically controlled air pump.

* * * * *